US006574684B1

(12) United States Patent
Chu

(10) Patent No.: US 6,574,684 B1
(45) Date of Patent: Jun. 3, 2003

(54) MONITOR COMPRISING TWO-WAY INTERFACE

(75) Inventor: Ping-Ying Chu, Tainan (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/531,198

(22) Filed: Mar. 20, 2000

(30) Foreign Application Priority Data

Jan. 19, 2000 (TW) ....................................... 89100829 A

(51) Int. Cl.[7] ................................................ G06F 3/00

(52) U.S. Cl. ............................ 710/30; 710/35; 710/69; 711/102

(58) Field of Search ............................ 710/1, 8, 5, 15, 710/18, 63, 72, 74, 128, 10, 102, 30, 31, 33, 35, 39, 52, 65, 69–71; 713/100, 310; 711/102, 103; 712/225

(56) References Cited

U.S. PATENT DOCUMENTS 4,053,740 A * 10/1977 Rosenthal .................... 463/31
5,532,844 A * 7/1996 Kagami et al. ............. 358/468
5,661,778 A * 8/1997 Hall et al. ..................... 379/29
5,675,717 A * 10/1997 Yamamoto .................. 358/1.9
6,125,449 A * 9/2000 Taylor et al. ............... 713/310
6,205,505 B1 * 3/2001 Jau et al. ..................... 710/126
6,289,466 B1 * 9/2001 Bayramoglu et al. ....... 713/310
6,323,854 B1 * 11/2001 Knox et al. ................. 345/418

* cited by examiner

*Primary Examiner*—Jeffrey Gaffin
*Assistant Examiner*—Mai Rijue
(74) *Attorney, Agent, or Firm*—J.C. Patents

(57) ABSTRACT

A monitor comprising two-way (plug and play) interface. A two-way interface is added in the monitor to achieve the function of mutual communication between a host hardware and monitor. Using the two-way interface, the specification data parameters are transferred to the host hardware, so that the host hardware can easily obtain the specification data parameters. Furthermore, the host hardware can send the parameters to the monitor controller to adjust the image data that meet the specification of the monitor to achieve the function and objective of plug-in of the monitor.

8 Claims, 1 Drawing Sheet

MONITOR COMPRISING TWO-WAY INTERFACE

CROSS-REFERENCE TO RELATED APPLICATION

This application claims the priority benefit of Taiwan application 89100829, filed Jan. 19, 2000.

BACKGROUND OF THE INVENTION

1. Field of the Invention

The invention relates in general to a hardware of a monitor. More particularly, the invention relates to a monitor comprising a two-way (plug and play) interface.

2. Description of the Related Art

A conventional display comprises 8 signal lines, such as the vertical synchronous signal line (Vsync), the horizontal synchronous signal line (Hsync), the serial data signal line (SDA), the serial clock signal line (SCL), the ground signal line (Gnd) the red signal line (R), the green signal line (G), and the blue signal line (B). The R, G, B are analog signals. Referring to FIG. 1, the connecting structure between a host hardware and a monitor is schematically illustrated. A monitor controller 12 (for example, a VGA card) in a host hardware is used to convert the image data generated by the host hardware 10. After the conversion, the converted image data is transferred to the monitor 20 via the signal lines.

The R, G, B signals are converted into digital pixel value by an analog/digital converter 22. The image data transferred from the host hardware 10 are displayed in a of the monitor 20 by a monitor control circuit 24 according to the vertical synchronous signal and the horizontal synchronous signal.

In the conventional monitor 20 with a screen saving apparatus or a power down apparatus, a monitoring circuit is added into the monitor control circuit 24. In this manner, the output signal of the analog/digital converter 22 is monitored. When the output signal is not changed after a period of time, the monitor enters a screen saving state or a power down state. That is, apart from the monitoring circuit, the power stops providing to rest of the circuit, while the monitoring circuit continues monitoring the output signal of the analog/digital converter 22. When the output signal is changed, the system is waked up immediately to retrieve the power supply for normal operation. Therefore, the power saving objective is achieved.

The conventional host hardware 10 transfers the image signals of the monitor 20 is a one-way manner. A monitoring circuit is thus required to monitor the variation of the output signal of the analog/digital converter 22, so as to determine whether the screen saving state or the power down state is entered. Though only the monitoring circuit is operating under this state, since the frequency of the R, G and B signals are very high, the power consumption is still considerable, so that the power saving is still limited.

Referring to FIG. 2, a connection structure between a conventional liquid crystal display monitor and a host hardware is shown. In the current monitor, especially for the liquid crystal display monitor (LCD Monitor) 40, the specifications of the LCD panels are variable, so that the frame rate and resolution are different because of different manufacturers or different dimensions of LCD panels. The conventional host hardware 50 delivers the image data of the monitor 40 in a one-way fashion. When the analog R, G and B.signals output by the monitor controller 32 are converted into digital image signals via an analog/digital converter 42. Or alternatively, the monitor controller 32 may output digital image signals directly. In both manners, an expensive scaling controller 46 is required to add in the monitor control circuit 32. According to the variable dimensions of the LCD panel, the image data sent to the monitor 20 is appropriately magnified or reduced, so that the resolution is adjusted and image data can meet the dimensions of the LDC panel without causing distortion of image. However, as the scaling controller is very expensive, the fabrication cost of the LCD monitor is increased.

SUMMARY OF THE INVENTION

The invention provides a monitor comprising a two-way interface, comprising a read only memory and a two-way interface. The read only memory stores a plurality of specification data parameters, and the two-way interface is coupled to the read only memory to deliver the specification data parameters.

With the two-way interface, the specification data parameters of the monitor can be sent to the host hardware to enable the monitor to give a command or parameters to a monitor controller. The image data sent to the monitor can be adjusted to meet the specification of the monitor. The functions of mutual communication between a host hardware and the monitor and plug and play can be obtained.

Moreover, the two-way interface can be used to control the screen saving state or the power down state of the monitor. Therefore, under this state, most of the circuit in the monitor can be stopped from being supplied with a power source.

The invention also provides a monitor comprising a two-way interface coupled to a host hardware. The monitor comprises an analog/digital converter, a monitor control circuit, a read only memory, and a two-way interface. The analog/digital converter is coupled to the host hardware to receive a plurality of image data from the host hardware, and to convert the image data. The monitor control circuit is coupled to the analog/digital converter to receive the image data output from the analog/digital converter, so as to display the image data. The read only memory, stores a plurality of specification data. The two-way interface is coupled to the read only memory, the analog/digital converter and the monitor control circuit to deliver the specification data parameters to the host hardware, and to deliver a plurality of commands between the host hardware and the monitor control circuit.

The invention also provides a monitor system with a two-way interface. The monitor system comprises a host hardware, an analog/digital converter, a monitor control circuit, a read only memory, and a two-way interface. The host hardware is to send a plurality of image data. The analog/digital converter is coupled to the host hardware to receive a plurality of image data sent from the host hardware and to convert the image data. The monitor control circuit is coupled to the analog/digital converter and to receive and display the image data output from the analog/digital converter. The read only memory stores the specification data parameters. The two-way interface is coupled to the read only memory, the analog/digital converter and the monitor control circuit, and to deliver the specification data parameters to the host hardware, and to deliver a plurality of control commands between the host hardware and the monitor control circuit.

Both the foregoing general description and the following detailed description are exemplary and explanatory only and are not restrictive of the invention, as claimed.

DESCRIPTION OF THE PREFERRED EMBODIMENTS

Figure 1:
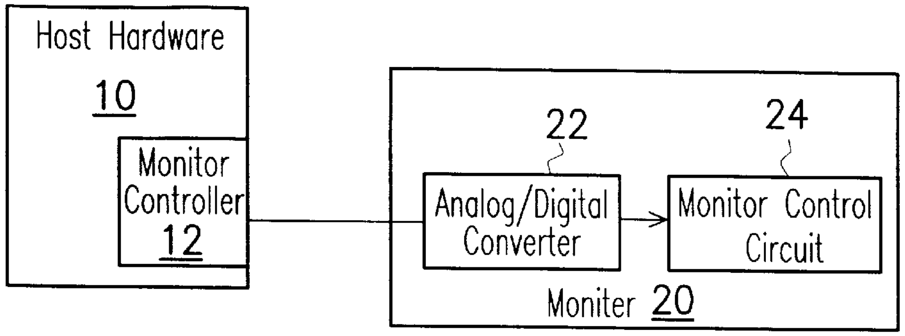
FIG. 1 (PRIOR ART)
FIG. 1 shows a conventional connection structure between a host hardware and a monitor.
Figure 2:
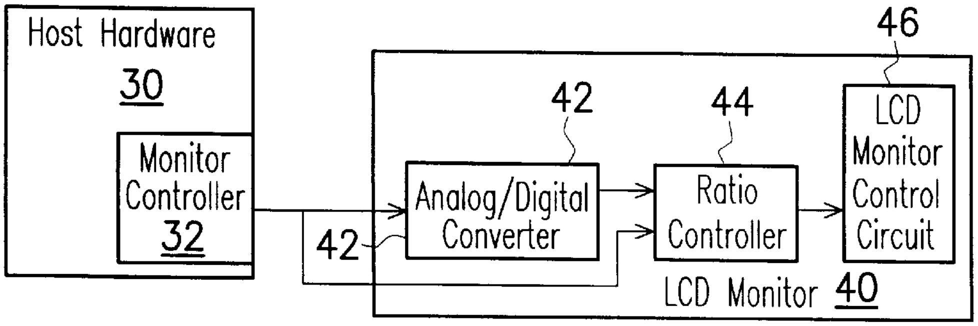
FIG. 2 shows a connection structure between a host hardware and a conventional liquid crystal display monitor.
Figure 3:
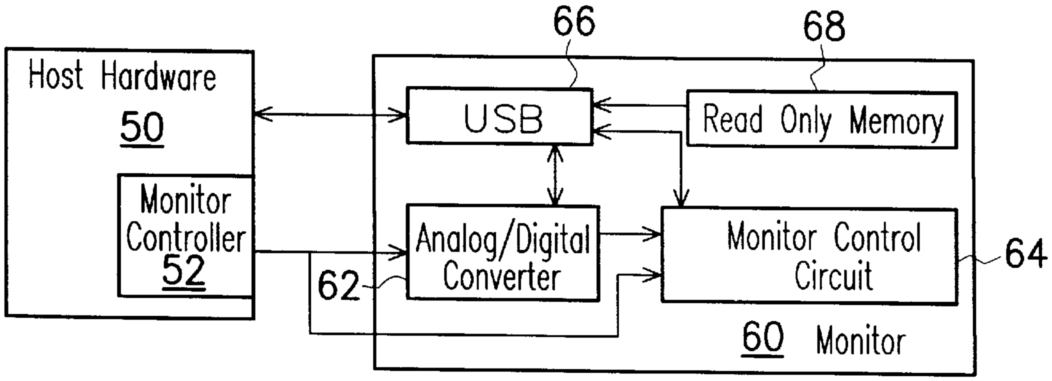
FIG. 3 shows a monitor comprising a two-way interface according to the invention.

FIG. 3 shows a monitor comprising a two-way (plug and play) interface according to the invention. The monitor of the invention comprises a feature that a two-way interface of a universal serial bus (USB) 66 is disposed on the monitor 60. The specification data parameters of the monitor are installed in a read only memory 68. The read only memory 68 comprises a flash memory or an electrically erasable programmable read only memory ($E^2$PROM).

While connecting the monitor 60 with the two-way interface with the host hardware 50 (for example, personal computer, PC) through the universal serial bus 66, the specification data parameters stored in the read only memory 68 can be sent to the host hardware 50. Further applying software used in the host hardware 50 and the calculating capability of the a central unit processor (CPU), the image data sent to the monitor 40 can be adjusted to match the dimension of the screen of the monitor 60, the frame rate and the resolution. Therefore, for monitors 60 with different specifications, the expensive scaling controller used in the conventional monitor control circuit 64 is no more required.

In addition to the software used in the host hardware 50 and the calculation of the CPU to change the image data of the monitor 60, the invention further connects the monitor comprising two-way interface 60 with the host hardware 50. Via the universal serial bus 66, the specification data parameters stored in the read only memory 68 can be sent to the host hardware 50. By directly changing the parameters of the monitor controller 52, (for example, VGA), the parameters can meet the requirements of the monitor 60. The image data of the monitor 60 can thus be adjusted to meet the dimension of the monitor 60, the frame rate and the resolution. Therefore, the expensive scaling controlled used in the conventional control circuit 64 is no more required. The fabrication cost is reduced, and the function of the plug and play is achieved.

The two-way interface USB 66 can also be functioned as a transmission line between the host hardware 50 and the monitor 60. For example, the host hardware 50 can give a control command directly via the USB 66 to require the monitor 40 to operate screen saving or power down. The monitor 60 can thus enter the state of screen saving or power down. That is, the monitor control circuit 64 does not have to monitor the output signal of the analog/digital converter 62 to consume power. That is, the power sources of the monitor 60 can all stop providing power to keep the communication between the monitor circuit and the host hardware 50 only via the USB 66, and to wait for a wake up command for the monitor. As a result, more power is saved.

In addition, the monitor 60 can also build a key to connect USB 66, so that the USB 66 can command the host hardware 50 for a wake up operation by pressing the key. invention thus comprises at least an advantage to function the mutual communication between the host hardware and the monitor.

The invention further comprises an advantage that using a two-way interface, the specification data parameters of the monitor can be sent to the host hardware, so that the host hardware can give parameters to the monitor controller to adjust the image data of the monitor. The image data can thus meet the specific monitor specification to achieve the functions and objective of plug and play.

The two-way interface of the monitor provided by the invention can also be used to control the screen saving state or the power down state of the monitor. Therefore, that under this state, most of the circuit in the monitor can be stopped from being supplied the source power to save power.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A monitor system with a two-way interface, comprising:

a host hardware, to send a plurality of image data;

an analog/digital converter, coupled to the host hardware to receive a plurality of image data sent from the host hardware, and to convert the image data;

a monitor control circuit, coupled to the analog/digital converter, to receive and display the image data output from the analog/digital converter;

a read only memory, to store the specification data parameters; and a two-way interface, coupled to the read only memory, the analog/digital converter and the monitor control circuit, to deliver the specification data parameters to the host hardware, and to deliver a plurality of control commands between the host hardware and the monitor control circuit;

wherein the two-way interface receives the specification data parameters stored in the read only memory and the host hardware generates the image data by calculation of a CPU and a software.

2. The monitor system according to claim 1, wherein the host hardware comprises personal computer.

3. The monitor system according to claim 1, wherein the read only memory comprises a flash memory.

4. The monitor system according to claim 1, wherein the read only memory comprises an electrical erasable programmable read only memory.

5. The monitor system according to claim 1, wherein the two-way interface comprises a universal serial bus.

6. A monitor system with a two-way interface, comprising:

a host hardware, to send a plurality of image data;

an analog/digital converter, coupled to the host hardware to receive a plurality of image data sent from the host hardware, and to convert the image data;

a monitor control circuit, coupled to the analog/digital converter, to receive and display the image data output from the analog/digital converter;

a read only memory, to store the specification data parameters; and a two-way interface, coupled to the read only memory, the analog/digital converter and the monitor control circuit, to deliver the specification data parameters to the host hardware, and to deliver a plurality of control commands between the host hardware and the monitor control circuit;

wherein the two-way interface receives the specification data parameters stored by the read only memory, and the host hardware generates the image data by setting a monitor controller.

7. The monitor system according to claim 6, wherein the monitor controller sets a plurality of parameters of the monitor controller.

8. The monitor system according to claim 6, wherein the monitor comprises a VGA card.

* * * * *